(12) United States Patent
Jeng et al.

(10) Patent No.: US 10,316,182 B2
(45) Date of Patent: Jun. 11, 2019

(54) LOW DIELECTRIC CONSTANT AND SOLVENTLESS RESIN COMPOSITION AND SUBSTRATE STRUCTURE

(71) Applicant: INDUSTRIAL TECHNOLOGY RESEARCH INSTITUTE, Hsinchu (TW)

(72) Inventors: Jyh-Long Jeng, New Taipei (TW); Jeng-Yu Tsai, Chiayi (TW); Wei-Ta Yang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 573 days.

(21) Appl. No.: 14/974,547

(22) Filed: Dec. 18, 2015

(65) Prior Publication Data

US 2017/0174880 A1 Jun. 22, 2017

(30) Foreign Application Priority Data

Dec. 16, 2015 (TW) .............................. 104142225 A

(51) Int. Cl.
| | |
|---|---|
| C08L 63/10 | (2006.01) |
| C08G 59/14 | (2006.01) |
| C08K 3/36 | (2006.01) |
| C08K 5/1515 | (2006.01) |
| H01B 3/40 | (2006.01) |

(52) U.S. Cl.
CPC .......... C08L 63/10 (2013.01); C08G 59/1433 (2013.01); C08K 3/36 (2013.01); C08K 5/1515 (2013.01); H01B 3/40 (2013.01)

(58) Field of Classification Search
CPC ....................................................... C08L 63/10
See application file for complete search history.

(56) References Cited

U.S. PATENT DOCUMENTS

| | | | |
|---|---|---|---|
| 4,601,944 A | | 7/1986 | Zussman |
| 4,894,413 A | | 1/1990 | Catsiff et al. |
| 5,571,593 A | * | 11/1996 | Arldt ........................ B32B 7/04 428/131 |
| 5,726,216 A | * | 3/1998 | Janke ...................... C08G 59/38 522/129 |
| 5,962,586 A | | 10/1999 | Harper |
| 5,993,965 A | * | 11/1999 | Flat ........................ C03C 25/106 428/375 |
| 6,194,024 B1 | * | 2/2001 | Arldt ...................... H05K 1/113 29/846 |
| 6,292,613 B1 | * | 9/2001 | Fort ....................... C03C 25/106 385/128 |
| 6,649,259 B1 | | 11/2003 | Hu et al. |
| 7,285,579 B2 | | 10/2007 | Ghoshal |
| 8,232,477 B2 | | 7/2012 | Kitamura et al. |
| 9,127,116 B2 | | 9/2015 | Xiu et al. |
| 2003/0166746 A1 | * | 9/2003 | Zhou ........................ C08G 59/24 523/400 |
| 2005/0089297 A1 | * | 4/2005 | Castellani ............. C03C 25/106 385/144 |
| 2005/0170187 A1 | | 8/2005 | Ghoshal | |
| 2013/0199724 A1 | | 8/2013 | Dershem | |
| 2014/0154939 A1 | | 6/2014 | Rong et al. | |

FOREIGN PATENT DOCUMENTS

| | | |
|---|---|---|
| CN | 1292556 A | 4/2001 |
| CN | 1396943 A | 2/2003 |
| CN | 1950420 A | 4/2007 |
| CN | 101068879 A | 11/2007 |
| CN | 101260221 A | 9/2008 |

(Continued)

OTHER PUBLICATIONS

Barcia et al., "Adhesive Properties of Epoxy Resin Modified by End-Functionalized Liquid Polybutadiene," Journal of Applied Polymer Science, vol. 93, 2004, pp. 2370-2378.

Barcia et al., "Synthesis and properties of epoxy resin modified with epoxy-terminated liquid polybutadiene," Polymer, vol. 44, 2003, pp. 5811-5819.

Cray Valley, "Poly bd® 600E and 605E Resins: Hydroxyl-Terminated Epoxidized Polybutadienes," Application Bulletin, Jan. 2010, 2 pages.

Pereira Soares et al., "Hydroxy-Terminated Polybutadiene Toughened Epoxy Resin: Chemical Modification, Microstructure, and Impact Strength," Advances in Polymer Technology, vol. 21, No. 1, 2002, pp. 25-32.

(Continued)

*Primary Examiner* — Megan McCulley
(74) *Attorney, Agent, or Firm* — Birch, Stewart, Kolasch & Birch, LLP

(57) ABSTRACT

A solventless resin composition with a low dielectric constant and a substrate structure are provided. The composition includes: (a) 20-50 parts by weight of a copolymer having the structure of Formula (I)

Formula (I)

$$HO\underbrace{\phantom{XXXX}}_{i}\underbrace{\phantom{XX}O\phantom{XX}}_{j}\underbrace{\phantom{XXXX}}_{k}\underbrace{\phantom{XXXX}}_{l}\underbrace{\phantom{XX}O\phantom{XX}}_{m}OH$$

wherein, i, j, k, l, and m are independently an integer from 1 to 10; (b) 50-80 parts by weight of a compound having the structure of Formula (II)

Formula (II)

(c) 80-100 parts by weight of a hardener; and (d) 70-100 parts by weight of an inorganic filler.

7 Claims, No Drawings

(56) References Cited

FOREIGN PATENT DOCUMENTS

| | | | |
|---|---|---|---|
| CN | 101575439 A | 11/2009 |
| CN | 102504532 A | 6/2012 |
| CN | 102634167 A | 8/2012 |
| CN | 103608726 A | 2/2014 |
| CN | 104379608 A | 2/2015 |
| EP | 1 233 663 A2 | 8/2002 |
| JP | H2-88622 A | 3/1990 |
| TW | 200936683 A | 9/2009 |
| TW | 201437276 A | 10/2014 |

OTHER PUBLICATIONS

Sprenger, "Epoxy resins modified with elastomers and surface-modified silica nanoparticles," Polymer, vol. 54, 2013 (Available online Jun. 18, 2013), pp. 4790-4797.

Tripathi et al., "Study on the Effect of Carboxyl Terminated Butadiene Acrylonitrile (CTBN) Copolymer Concentration on the Decomposition Kinetics Parameters of Blends of Glycidyl Epoxy . . . ," International Journal of Organic Chemistry, vol. 1, 2011 (Published online Sep. 2011), pp. 105-112.

Taiwanese Office Action, dated Jun. 14, 2016, for Taiwanese Application No. 104142225.

Chinese Office Action for Appl. No. 201510993008.7 dated Jul. 27, 2018.

Yu, W., et al, "Polymer Dielectric Chemisty," China Machine Press, Jul. 31, 1980, p. 131.

* cited by examiner

LOW DIELECTRIC CONSTANT AND SOLVENTLESS RESIN COMPOSITION AND SUBSTRATE STRUCTURE

CROSS REFERENCE TO RELATED APPLICATIONS

This application claims priority of Taiwan Patent Application No. 104142225, filed on Dec. 16, 2015, the entirety of which is incorporated by reference herein.

TECHNICAL FIELD

The technical field relates to a solventless resin composition with a low dielectric constant and substrate structure.

BACKGROUND

The trend in electronic products has been toward smaller sizes, lighter weights, higher speed, and higher-frequency transmission. Therefore, the distribution for printed circuit boards are toward high-density, and the materials used in circuit boards tend to have more stringent requirements. In order to maintain the transmission rate and transmission signal integrity, the filling materials for the vias of printed circuit boards have a low dielectric constant (dielectric constant, Dk) and a low dissipation factor (dissipation factor, DO. In the meantime, in order to keep the normal functions of electronic components under a high-temperature environment and being used for a coaxial process to fill the vias, the via filling materials should have high heat resistance and punchability.

Accordingly, a novel composition is desired for improving the performance and reducing Dk and Df of the via filling materials.

SUMMARY

According to embodiments of the disclosure, the disclosure provides a solventless resin composition with a low dielectric constant which includes: (a) 20-50 parts by weight of a copolymer having the structure of Formula (I)

wherein, i, j, k, l, and m are independently an integer from 1 to 10; (b) 50-80 parts by weight of a compound having the structure of Formula (II)

Formula (II)

(c) 80-100 parts by weight of a hardener; and (d) 70-100 parts by weight of an inorganic filler.

According to another embodiment of the disclosure, the disclosure also provides a substrate structure, which includes: a substrate, having at least one via; and a filling material filling in the via, wherein the filling material is a cured product prepared from the solventless resin composition with a low dielectric constant.

A detailed description is given in the following embodiments.

DETAILED DESCRIPTION

One embodiment provides a solventless resin composition with a low dielectric constant. Based on the specific components and proportion of the solventless resin composition, the cured product prepared from the solventless resin composition has low dielectric constant (Dk) and low dissipation factor (Df). The dielectric constant is around 2.5-2.98 and the dissipation factor measured in 10 GHz is around 0.013-0.015. Furthermore, due to the improved punchability, heat resistance, chemical resistance, and via-filling ability, the cured product prepared from the solventless resin composition can be applied in the PCB industry for such via processing as coaxial vias, to improve impedance mismatch loss.

In one embodiment, the solventless resin composition with a low dielectric constant includes: (a) 20-50 parts by weight of a copolymer having the structure of Formula (I), Formula (I)

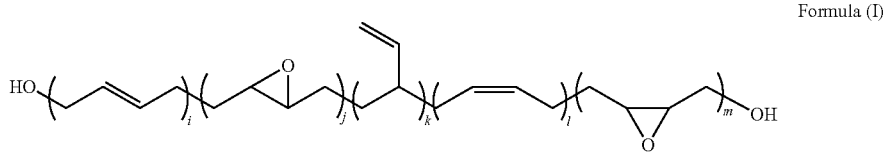

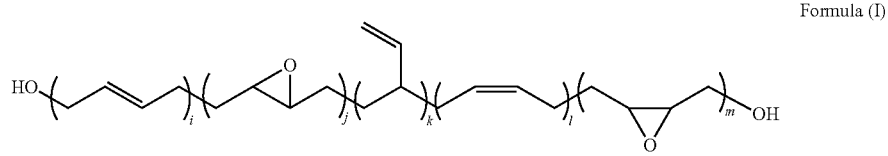

Formula (I)

wherein, i, j, k, l, and m are independently an integer from 1 to 10, for example, i, j, k, l, and m can be 1, 2, 3, 4, 5, 6, 7, 8, 9 or 10 individually; (b) 50-80 parts by weight of a compound having the structure of Formula (II)

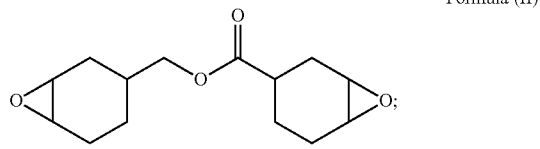

Formula (II)

(c) 80-100 parts by weight of a hardener; and (d) 70-100 parts by weight of an inorganic filler. The range of the aforementioned i, j, k, l and m can be adjusted according to selected commercial products, or it can be determined by the proportion of polymerization synthesis of monomers. It should be noted that the corresponding i, j, k, l, and m of repeat units in copolymer formula (I) can be regular or irregular.

Since the solvent is volatile during via-filling compositions, the use of a solvent would cause voids within the body of the via fill. It is desirable to avoid promoting voids that occur as the solvent evaporates in the via-filling process, which can lead to the via-filled cured product being discontinuous. According to the disclosure, the solventless resin composition with a low dielectric constant is solvent (ex. water or organic solvent)-free. Therefore, the hardener includes liquid hardener, such as methyl hexahydrophthalic anhydride, methyltetrahydrophthalic anhydride, maleic anhydride (MA), polystyrene-co-maleic anhydride (SMA) or a combination thereof. Examples of the inorganic filler which is used to reduce the thermal expansion coefficient include silicon dioxide, barium sulfate, calcium carbonate, or a combination thereof.

In one embodiment, the sum of the copolymer having the structure of Formula (I) and the compound having the structure of Formula (II) is 100 parts by weight. The dielectric constant is higher when the amount of the copolymer having the structure of Formula (I) is decreased to, for example, less than 20 parts by weight. The glass transition temperature will decrease when the amount of the copolymer having the structure of Formula (I) is increased, for example, to greater than 50 parts by weight. According to the disclosure, the amount of the hardener can be 80-100 parts by weight when the sum of the copolymer having the structure of Formula (I) and the compound having the structure of Formula (II) is 100 parts by weight. If the amount of the hardener is not within the above described range, the chemical resistance and the punchability of the cured product prepared from the solventless resin composition with a low dielectric constant will decrease. According to the disclosure, the amount of the inorganic filler can be 70-100 parts by weight when the sum of the copolymer having the structure of Formula (I) and the compound having the structure of Formula (II) is 100 parts by weight.

If the amount of the inorganic filler is not within the above described range, the cured product prepared from the solventless resin composition with a low dielectric constant exhibits a higher dissipation factor and poor hardness.

According to an embodiment of the disclosure, the solventless resin composition with a low dielectric constant further includes 1-60 parts by weight of an additive, wherein the additive includes a catalyst, leveling agent, colorant, defoamer, flame retardants, or a combination thereof.

One embodiment of the disclosure provides a substrate structure includes a cured product prepared from the solventless resin composition with a low dielectric constant. The substrate structure includes a substrate (such as a printed circuit board, printed wire board) having at least one via (such as a via having a size in a range of 100 μm-2 mm), and a filling material filling in the via, wherein the filling material is a cured product prepared from the solventless resin composition with a low dielectric constant as above described. It is noted that the via includes via, via hole, through hole, blind via or buried via etc. The solventless resin composition with a low dielectric constant of the disclosure can be formed on the substrate, for example, by a screen printing method, and be cured at a specific processing temperature (such as 150° C.-200° C.).

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Solventless resin composition with a low dielectric constant

EXAMPLE 1

15 g of copolymer having the structure of Formula (I) (with a weight average molecular weight of 1300, epoxy equivalent weight of 260-330 gram/equivalent, and acid value of 1.74 (meq/g)), 15 g of compound having the structure of Formula (II) (with a trade No. of ERL-4221, sold by Dow), and 24 g of methyl hexahydrophthalic anhydride (MEHHPA) are mixed and completely stirred to form a mixture. Next, 21 g of silicon dioxide inorganic power (with a trade No. of 525, sold by Sibelco), 0.9 g of fused silica (with a trade No. of TS-720, sold by Cabot) and 1 g of defoamer (with a trade No. of KS-66, sold by Shin-Etsu Chemical Co., Ltd.) were added to the mixture and then subjected to a grinding/dispersion process by a triple-roll mill. After adding 1 g of 4-dimethylaminopyridine (DMAP) as a catalyst, the solventless resin composition (1) with a low dielectric constant was obtained.

EXAMPLE 2

10 g of copolymer having the structure of Formula (I) (with a weight average molecular weight of 1300, epoxy equivalent weight of 260-330 gram/equivalent, and acid value of 1.74 (meq/g)), 20 g of compound having the structure of Formula (II) (with a trade No. of ERL-4221, sold by Dow), and 28 g of methyl hexahydrophthalic anhydride (MEHHPA) are mixed and completely stirred to form a mixture. Next, 23 g of silicon dioxide inorganic power (with a trade No. of 525, sold by Sibelco), 1 g of fused silica (with a trade No. of TS-720, sold by Cabot) and 1.2 g of defoamer (with a trade No. of KS-66, sold by Shin-Etsu Chemical Co., Ltd.) were added to the mixture and then subjected to a grinding/dispersion process by a triple-roll mill. After adding 1.1 g of 4-dimethylaminopyridine (DMAP) as a catalyst, the solventless resin composition (2) with a low dielectric constant was obtained.

EXAMPLE 3

10 g of copolymer having the structure of Formula (I) (with a weight average molecular weight of 1300, epoxy equivalent weight of 260-330 gram/equivalent, and acid value of 1.74 (meq/g)), 30 g of compound having the structure of Formula (II) (with a trade No. of ERL-4221, sold by Dow), and 40 g of methyl hexahydrophthalic anhydride (MEHHPA) are mixed and completely stirred to form a mixture. Next, 32 g of silicon dioxide inorganic power (with a trade No. of 525, sold by Sibelco), 1.6 g of fused silica (with a trade No. of TS-720, sold by Cabot) and 1.5 g of defoamer (with a trade No. of KS-66, sold by Shin-Etsu Chemical Co., Ltd.) were added to the mixture and then subjected to a grinding/dispersion process by a triple-roll mill. After adding 4-dimethylaminopyridine (DMAP) 1.6 g as a catalyst, the solventless resin composition (3) with a low dielectric constant was obtained.

EXAMPLE 4

10 g of copolymer having the structure of Formula (I) (with a weight average molecular weight of 1300, epoxy equivalent weight of 260-330 gram/equivalent, and acid value of 1.74 (meq/g)), 40 g of compound having the structure of Formula (II) (with a trade No. of ERL-4221, sold by Dow), and 50 g of methyl hexahydrophthalic anhydride (MEHHPA) are mixed and completely stirred to form a mixture. Next, 50 g of silicon dioxide inorganic power (with a trade No. of 525, sold by Sibelco), 2 g of fused silica (with a trade No. of TS-720, sold by Cabot) and 2 g of defoamer (with a trade No. of KS-66, sold by Shin-Etsu Chemical Co., Ltd.) were added to the mixture and then subjected to a grinding/dispersion process by a triple-roll mill. After adding 2 g of 4-dimethylaminopyridine (DMAP) as a catalyst, the solventless resin composition (4) with a low dielectric constant was obtained.

COMPARATIVE EXAMPLE 1

30 g of compound having the structure of Formula (II) (with a trade No. of ERL-4221, sold by Dow), and 30 g of methyl hexahydrophthalic anhydride (MEHHPA) are mixed and completely stirred to form a mixture. Next, 33 g of silicon dioxide inorganic power (with a trade No. of 525, sold by Sibelco), 1.5 g of fused silica (with a trade No. of TS-720, sold by Cabot) and 1.2 g of defoamer (with a trade No. of KS-66, sold by Shin-Etsu Chemical Co., Ltd.) were added to the mixture and then subjected to a grinding/dispersion process by a triple-roll mill. After adding 1.1 g of 4-dimethylaminopyridine (DMAP) as a catalyst, the solventless resin composition (5) with a low dielectric constant was obtained.

COMPARATIVE EXAMPLE 2

30 g of epoxy resin (with a trade No. of Epikot 828, sold by Dow), and 24 g of methyl hexahydrophthalic anhydride (MEHHPA) are mixed and completely stirred to form a mixture. Next, 22 g of silicon dioxide inorganic power (with a trade No. of 525, sold by Sibelco), 0.9 g of fused silica (with a trade No. of TS-720, sold by Cabot) and 1 g of defoamer (with a trade No. of KS-66, sold by Shin-Etsu Chemical Co., Ltd.) were added to the mixture and then subjected to a grinding/dispersion process by a triple-roll mill. After adding 1 g of 4-dimethylaminopyridine (DMAP) as a catalyst, the solventless resin composition (6) with a low dielectric constant was obtained. Measurement of the properties of the solventless resin composition with a low electric constant Individually, via holes disposed within PCB having a diameter of 800 μm were filled with the solventless resin composition (1)-(6) obtained from example 1-4 and comparative example 1-2. Next, after curing at 180° C. for 60 minutes, cured products (1)-(6) were obtained individually. There were no voids or slashes to be observed in the cured product formed in the via holes by a scanning electron microscope.

Subsequently, the glass transition temperature (Tg), dielectric constant (Dk) and dissipation factor (DO of aforementioned cured products (1)-(6) were individually measured. The drilling assessment was determined by mechanically drilling the cured products. If the cured product does not come away from the via hole and there are no cracks observed within the cured products, it is considered a "pass". The glass transition temperature (Tg), dielectric constant (Dk), dissipation factor (DO, and drilling assessment were measured and tabulated in Table 1.

TABLE 1

|  | cured product (1) | cured product (2) | cured product (3) | cured product (4) | cured product (5) | cured product (6) |
| --- | --- | --- | --- | --- | --- | --- |
| Tg (° C.) | 180 | 200 | 211 | 223 | 240 | 150 |
| dielectric constant (Dk) | 2.72 | 2.81 | 2.90 | 2.98 | 3.0 | 4.2 |
| dissipation factor (Df, 10 GHz) | 0.013 | 0.014 | 0.014 | 0.015 | 0.016 | 0.025 |
| drilling assessment | pass | pass | pass | pass | fail | pass |

Table 1 shows that under the specific components and proportions of the solventless resin composition, the cured products prepared from the solventless resin composition have a low dielectric constant (Dk) and low dissipation factor (DO. The dielectric constant is around 2.5-2.98 and the dissipation factor at 10 GHz is around 0.013-0.015. Furthermore, due to improved punchability, heat resistance, chemical resistance, and via-filling ability, the solventless resin composition can be suitable for application in the PCB industry for via processing such as coaxial via, to improve impedance mismatch loss.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A solventless resin composition with a low dielectric constant, consisting of:
   (a) 20-50 parts by weight of a copolymer having a structure of Formula (I)

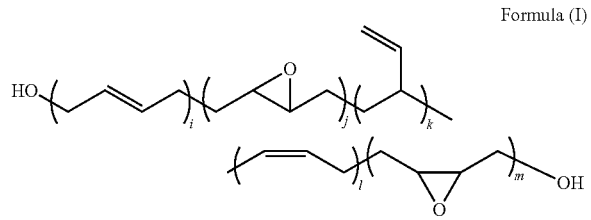

Formula (I)

wherein, i, j, k, l, and m are independently an integer from 1 to 10;
   (b) 50-80 parts by weight of a compound having a structure of Formula (II)

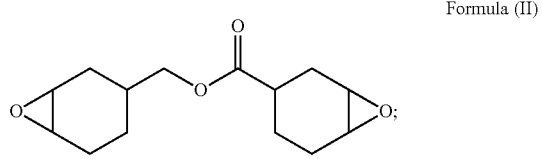 [SMILES: O=C(OCC1CCC2OC2C1)C1CCC2OC2C1]

Formula (II)

(c) 80-100 parts by weight of a hardener;
   (d) 70-100 parts by weight of an inorganic filler, wherein the inorganic filler is silicon dioxide, barium sulfate, calcium carbonate, or a combination thereof; and
   (e) 1-60 parts by weight of an additive, wherein the additive is a catalyst, leveling agent, colorant, defoamer, flame retardant, or a combination thereof.

2. The solventless resin composition with a low dielectric constant as claimed in claim 1, wherein the copolymer having a structure of Formula (I) has a weight-average molecular weight of about 1000-2000.

3. The solventless resin composition with a low dielectric constant as claimed in claim 1, wherein the copolymer having a structure of Formula (I) has an epoxy equivalent weight of 200-600 gram/equivalent.

4. The solventless resin composition with a low dielectric constant as claimed in claim 1, wherein the hardener comprises methyl hexahydrophthalic anhydride, methyltetrahydrophthalic anhydride, maleic anhydride, polystyrene-co-maleic anhydride or a combination thereof.

5. The solventless resin composition with a low dielectric constant as claimed in claim 1, wherein the sum of the copolymer having a structure of Formula (I) and the compound having a structure of Formula (II) is 100 parts by weight.

6. The solventless resin composition with a low dielectric constant as claimed in claim 1, where a cured product prepared from the solventless resin composition with a low dielectric constant has a dielectric constant of 2.5-2.98, and a dissipation factor of 0.013-0.015.

7. A substrate structure, comprising:
   a substrate having at least one via; and
   a filling material filling in the via, wherein the filling material is a cured product prepared from the solventless resin composition with a low dielectric constant as claimed in claim 1.

* * * * *